Figure 1:
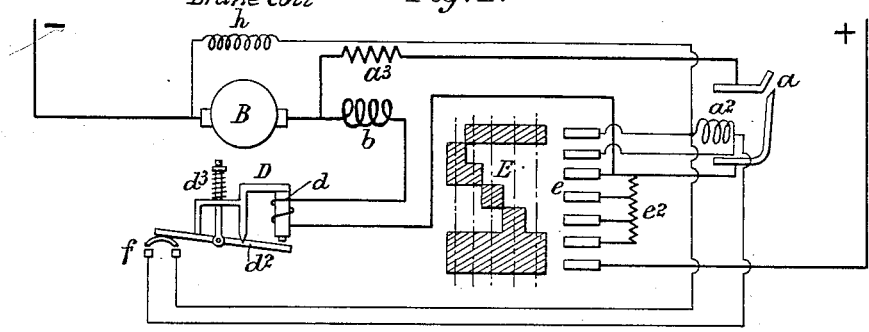

W. H. SCOTT AND J. BENTLEY.
SYSTEM OF CONTROL FOR ELECTRIC MOTORS OPERATING CRANES AND ANALOGOUS APPARATUS.
APPLICATION FILED JAN. 30, 1920.

1,399,664.

Patented Dec. 6, 1921.

INVENTORS
WILLIAM HARDING SCOTT
JOHN BENTLEY
BY Howson and Howson
ATTORNEYS

UNITED STATES PATENT OFFICE.

WILLIAM HARDING SCOTT AND JOHN BENTLEY, OF NORWICH, ENGLAND.

SYSTEM OF CONTROL FOR ELECTRIC MOTORS OPERATING CRANES AND ANALOGOUS APPARATUS.

1,399,664.   Specification of Letters Patent.   Patented Dec. 6, 1921.

Application filed January 30, 1920. Serial No. 355,192.

(GRANTED UNDER THE PROVISIONS OF THE ACT OF MARCH 3, 1921, 41 STAT. L., 1313.)

*To all whom it may concern:*

Be it known that we, WILLIAM HARDING SCOTT and JOHN BENTLEY, both subjects of the King of Great Britain, residing at Gothic Works, Norwich, in the county of Norfolk, England, have invented new and useful Improvements in Systems of Control for Electric Motors Operating Cranes and Analogous Apparatus, (for which I have filed applications in England Feb. 13, 1917, No. 2,157, and Sept. 7, 1917, No. 12,855, cognate applications, Patent No. 113,993,) of which the following is a specification.

It is known that a motor with series winding, whether a series-wound motor, or a compound wound motor, gives a considerable amount of automatic change-speed effect, but owing to the saturation effect, by which the magnetism, after a certain point, does not increase, the change-speed effect is limited, this being especially the case with low-price commercial series-wound motors, the magnetic circuit of which rapidly becomes saturated. Cranes and lifting appliances fitted with such motors and, for certain classes of work, provided with mechanical change-speed devices, are complicated and not automatic and are unsatisfactory where the loads to be lifted vary considerably and especially where the controlling is done by unskilled operatives as is, for instance, often the case on board ship. In order to increase the automatic change-speed effect, it has been proposed to shunt, or divert, the current from the series winding of the electric motor so that the required effect is obtained automatically, no alteration of the field occurring for heavy loads but only when the load is light, and consequently the motor is not fully loaded, the effective turns in the series winding being then reduced relatively to the current in the armature so that the speed is then increased considerably more than is the case with the ordinary series-winding effect.

Our invention relates to the last mentioned method of control for series, or compound, wound electric motors and consists principally in the arrangement of an electro-magnetic switch which automatically discriminates when the load attains a predetermined amount (and is termed a load discriminator, hereinafter and in the claims, or load discriminators,) in such manner that the operating circuit of the contactor which shunts the series winding is only in the circuit on the last step, or one of the last steps, of the controller so that the motor always starts up on full field. The operating coil, which actuates the contactor, should be of low resistance and in series with some other resistance.

We will describe, with reference to the accompanying drawings, how this invention may be performed.

Figure 2:
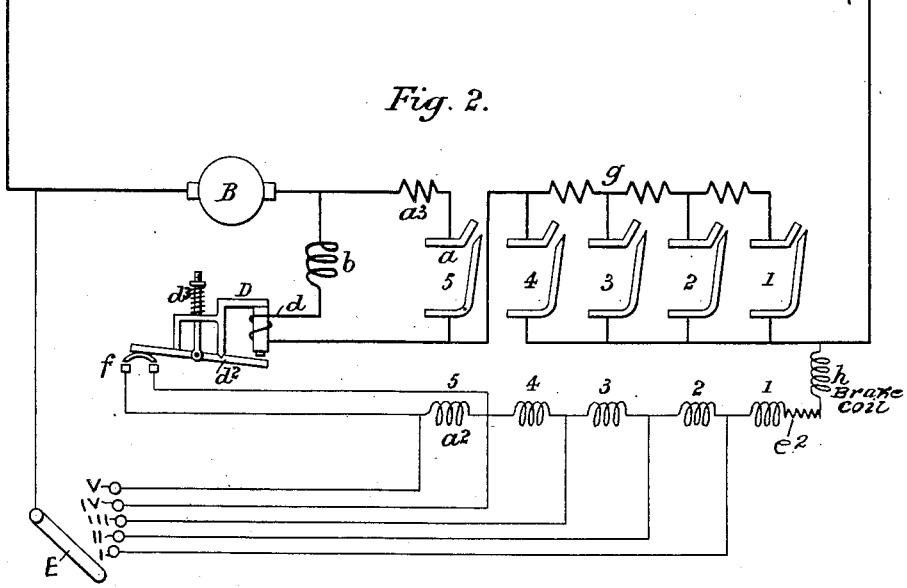
Figure 3:
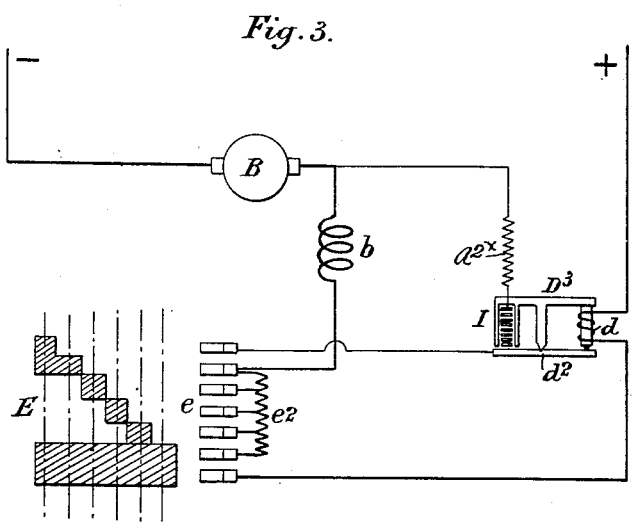

Figure 1 is a diagram showing an arrangement in accordance with this invention applied to a system in which a drum controller is employed. Fig. 2 is a diagram illustrating a like arrangement but applied to a system in which a contactor, or relay switch controller is employed. Fig. 3 is a diagram showing an arrangement in which a column of carbon blocks, disks, or the like, is employed in series with the shunt, or diverter, of the series winding of the motor as hereinafter explained.

Referring first to Figs. 1 and 2:—

$a$ represents an electrically operated contactor for shunting the series winding of the motor B, which winding is indicated at $b$ the coil which closes the contactor being represented at $a^2$. The contactor is caused to close on only the last, or one of the last, or full-speed, steps of the controller, so that the motor starts upon the full series winding and we use the electro-magnetic load discriminator hereinbefore mentioned and indicated at D, the coil $d$ of which is in circuit with the series winding $b$ of the motor and operates an armature $d^2$ which is attracted when the current in the coil $d$ is above any predetremined amperage, and then operates contacts at $f$, so as to open the series-shunting contactor $a$ which remains open as long as the amperes in this load-discriminator coil $d$ are above a certain amount, but as soon as the current has fallen below a certain amount, which is adjustable (for instance by altering the tension of the spring $d^3$ by means of a nut screwing on a stem connected with the armature $d^2$ so as to act in opposition to the attractive force of the coil $d$) the armature $d^2$ is released and the series-winding, and the load discriminator coil, are shunted, or diverted, owing to the contactor coil $a^2$ being energized and thereby closing the contactor $a$.

E represents the controller, $e$ the contacts thereof, $e^2$ the resistances in connection with such contacts, $a^3$ is the series diverter resistance and $h$ is the brake coil. These operate analogously to the equivalent arrangement shown in Fig. 2, as will be understood from the description thereof hereinafter given.

In Fig. 2 the parts which correspond with those shown in Fig. 1 are marked with like reference letters. In this Fig. 2, the starting resistances and their coils are indicated at 1 to 5, and, as aforesaid, the arrangement according to this invention is like that shown in Fig. 1 except that in Fig. 2 it is shown applied to a system in which a contactor or relay switch controller is employed.

The master switch E, when it makes contact with the first contact I, completes the circuit through the operating coil of the contactor 1, resistance $e^2$, and brake coil $h$, and the contactor 1 is operated and starts the motor. When the switch E goes onto the second contact II the contactor coil 2 is operated, and so on with the contacts III, IV, V, and the contactors 3, 4 and 5, the switch reaching a succeeding contact before it breaks contact with the preceding one.

The coil $a^2$, cannot be made inoperative until it is short-circuited by the switch E being on the last contact V, and even then the said coil will not be energized unless the discriminator contact be opened, which will only be the case when the load has come down to the predetermined amount.

It is desirable that the load discriminator shall be such that while it will pull in with a certain current, it will drop out with a comparatively slight reduction of that current. To accomplish this practically the movement of the armature should be small and, to prevent injurious sparking at the contacts, with this small movement, it is desirable that the voltage, used in operating the series diverting contactor coil, shall be as small as possible. We therefore, for the series-shunting contactor, use a coil which is put in series with a resistance, preferably, with the brake coil, or other available coil. By this, or analogous, means we can utilize a comparatively large current in the contactor-operating coil and consequently comparatively low voltage, which can effectively complete and interrupt a circuit of low resistance to by-pass the current from it with but a small movement and yet without danger of burning the contacts.

Although we have shown but one load discriminator and adjuncts it will be understood that we may use more than one, if desired, or we may use one load discriminator to operate successive shunting contactors so as to maintain the speed on lifting as the loads are reduced and our claims cover these variations.

Fig. 3 illustrates an arrangement in which the coil $d$ of the electro-magnetic load discriminator $D^3$ is arranged in series with the motor B outside the circuit of the series winding of the motor, so that the coil $d$ is not shunted with the series winding. If desired, however, it may be arranged inside such series winding as shown in Fig. 1. If outside the series winding, the coil $d$ carries the whole of the current from the main supply and is not shunted with the series winding as in Fig. 1. In Fig. 3, we use, as the equivalent of a container, a column of carbon blocks, disks, or the like, indicated at I, which are in series with the resistance $a^{2x}$ of the shunt of the series winding $b$. The coil $d$, of the discriminator $D^3$, operating the armature $d^2$ breaks the circuit on these carbon blocks, disks, or the like, or, by reducing the pressure thereon, varies the total resistance used for shunting the series winding. By this means a graduated automatic shunting of the series winding is obtainable.

The operating coil of the series diverter contactor $a$, or the column I, we put in the last step, or one of the last steps, of the controller as illustrated, as, by this means, the series diverting devices cannot operate during the earlier stages so that the motor always starts up on full series field.

What we claim is:—

1. The combination of an electric motor having a series winding, stepped controller means for starting the motor on full field, and means associated with the controller toward its last steps to automatically shunt current from the series winding when the motor current exceeds a predetermined amperage.

2. The combination of an electric motor having a series winding, stepped controller means for starting the motor on full field, and electro-magnetically operated means associated with the controller toward its last steps to automatically shunt current from the series winding when the motor current exceeds a predetermined amperage.

3. The combination of an electric motor having a series winding, stepped controller means for starting the motor on full field, and electro-magnetically operated means associated with the controller toward its last steps to automatically shunt current from the series winding when the motor current exceeds a predetermined amperage, said electromagnetically operated means comprising a low resistance operating coil for the electro-magnet.

4. The combination with an electric motor having a series winding, stepped controller means for starting the motor on full field, and electro-magnetically operated means associated with the last steps of the controller for automatically shunting current from the motor winding upon reduction of the motor load.

5. The combination of an electric motor having a series winding, a resistance, stepped controller means for starting the motor on full field, and means associated with the controller toward its last steps to automatically shunt current from the series winding through said resistance when the motor current exceeds a predetermined amperage.

In testimony whereof we have signed our names to this specification in the presence of two subscribing witnesses.

WILLIAM HARDING SCOTT.
JOHN BENTLEY.

Witnesses:
S. A. THONLESS,
EVA M. MAYERS.